(12) United States Patent
Berdine

(10) Patent No.: US 7,152,361 B2
(45) Date of Patent: Dec. 26, 2006

(54) FISHING LURE

(76) Inventor: Steven L. Berdine, 9101 Olcott Ave., St. John, IN (US) 46373

( * ) Notice: Subject to any disclaimer, the term of this patent is extended or adjusted under 35 U.S.C. 154(b) by 70 days.

(21) Appl. No.: 10/927,878

(22) Filed: Aug. 27, 2004

(65) Prior Publication Data

US 2006/0042149 A1 Mar. 2, 2006

(51) Int. Cl.
*A01K 85/00* (2006.01)

(52) U.S. Cl. .................. 43/42.24; 43/42.26; 43/42.28; 43/42.3; 43/42.34

(58) Field of Classification Search ............... 43/42.24, 43/24.26, 24.28, 24.3, 24.34
See application file for complete search history.

(56) References Cited

U.S. PATENT DOCUMENTS

| 4,139,964 A | 2/1979 | Pelletier |
| 5,276,992 A | 1/1994 | Kato |
| 6,035,574 A | 3/2000 | Ware |
| 6,393,755 B1 | 5/2002 | Weaver |
| 6,408,566 B1 * | 6/2002 | Ward, Sr. .................. 43/42.31 |
| 2003/0066231 A1* | 4/2003 | Ollis et al. .................. 43/42.24 |
| 2003/0196368 A1* | 10/2003 | Ito ............................ 43/42.24 |

* cited by examiner

*Primary Examiner*—Darren W. Ark
*Assistant Examiner*—John D. Holman
(74) *Attorney, Agent, or Firm*—Dale J. Ream

(57) ABSTRACT

A fishing lure according to the present invention includes a flexible elongate body member, a cupped tail member attached to one end of the body member, and rib members connecting the body member to an inner surface of the cupped tail member. The cupped tail member is biased toward the concave configuration due to the presence of the rib members and the material used to construct the cupped tail member. The cupped tail member creates sound waves by moving between concave and convex configurations, and it also slows the fishing lure's movement through the water. Scent and color schemes are added to the fishing lure to attract fish and for identification purposes.

17 Claims, 2 Drawing Sheets

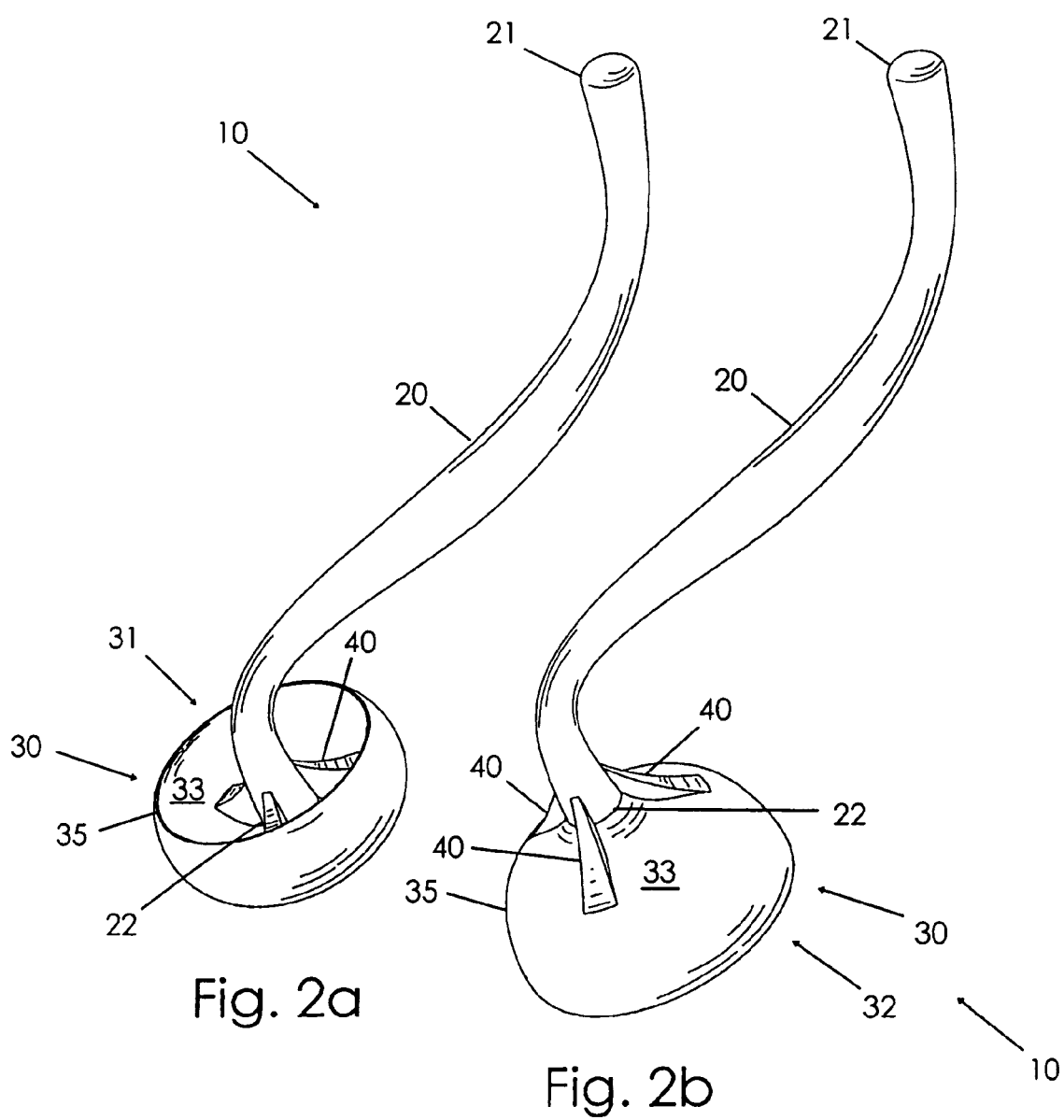

FISHING LURE

BACKGROUND AND SUMMARY OF THE INVENTION

This invention relates generally to a fishing lure. In particular, the present invention relates to a fishing lure with a cupped tail.

Fish senses vary from species to species. The extent that fish rely on sight, sound, or smell varies according to the environment the species is generally found in. Catfish and other bottom feeders that are often found in murky water rely heavily on smell to catch prey. Trout and other cold water fish are able to use an acute sense of sight. Because water is such a good conductor of sound, however, almost all fish rely on a sense of hearing. Some fish (including bass) have true ears. These organs are much like human ears. Although there is no ear opening, the soft tissues of the fish body transmit the sound to a bony structure (otolith) that vibrates against a series of sensing hairs. These hairs then send the auditory information to the fish's brain.

While some fish have true ears as described above, all species of fish have sensory organs called lateral lines. These lateral lines run along the sides of the fish and can detect extremely low frequencies. These low-frequency vibrations include the footsteps of a fisherman on shore and the back and forth motions of a fish tail in the water.

Soft plastic lures have been designed in the past having unique tail sections that cause the lures to move back and forth through the water unpredictably. A few lures also generate pressure waves to attract fish. U.S. Pat. No. 6,393,755 discloses a flexible life-like fishing lure having an opening in its main body member and/or appendages to impart movement to the lure. The openings deflect water as the lure is moved, generating hydrodynamic pressure waves that help attract fish. U.S. Pat. App. No. 20020194770 discloses a fishing lure with detachable appendages to create different vibrations and movements through the water.

While assumably effective for their intended purposes, none of the above proposals provide a fishing lure with a cupped tail member that moves between concave and convex configurations to create low frequency pulses. A fishing lure according to the present invention includes a flexible elongate body member, a cupped tail member attached to one end of the body member, and rib members connecting the body member to an inner surface of the cupped tail member. The cupped tail member is biased toward the concave configuration due to the presence of the rib members and the material used to construct the fishing lure. The cupped tail member creates sound waves by moving between concave and convex configurations, and it also slows the fishing lure's movement through the water. Scent and color schemes are added to the fishing lure for various purposes, such as to attract fish or to distinguish the present invention from other lures in a fisherman's tackle box.

Therefore, a general object of this invention is to provide a fishing lure that attracts fish with low frequency pulses.

Another object of this invention is to provide a fishing lure, as aforesaid, that attracts fish with its movement through water.

Still another object of this invention is to provide a fishing lure, as aforesaid, that attracts fish with its shape.

Yet another object of this invention is to provide a fishing lure, as aforesaid, that attracts fish with its scent.

A further object of this invention is to provide a fishing lure, as aforesaid, that is easy and inexpensive to manufacture.

Other objects and advantages of this invention will become apparent from the following description taken in connection with the accompanying drawings, wherein is set forth by way of illustration and example, embodiments of this invention.

BRIEF DESCRIPTION OF THE DRAWINGS

FIG. 2a is a perspective view of the fishing lure as in FIG. 1 with the tail member in a concave configuration; and FIG. 2b is a perspective view of the fishing lure as in FIG. 1 with the tail member in a convex configuration.

DESCRIPTION OF THE PREFERRED EMBODIMENT

Figure 1:
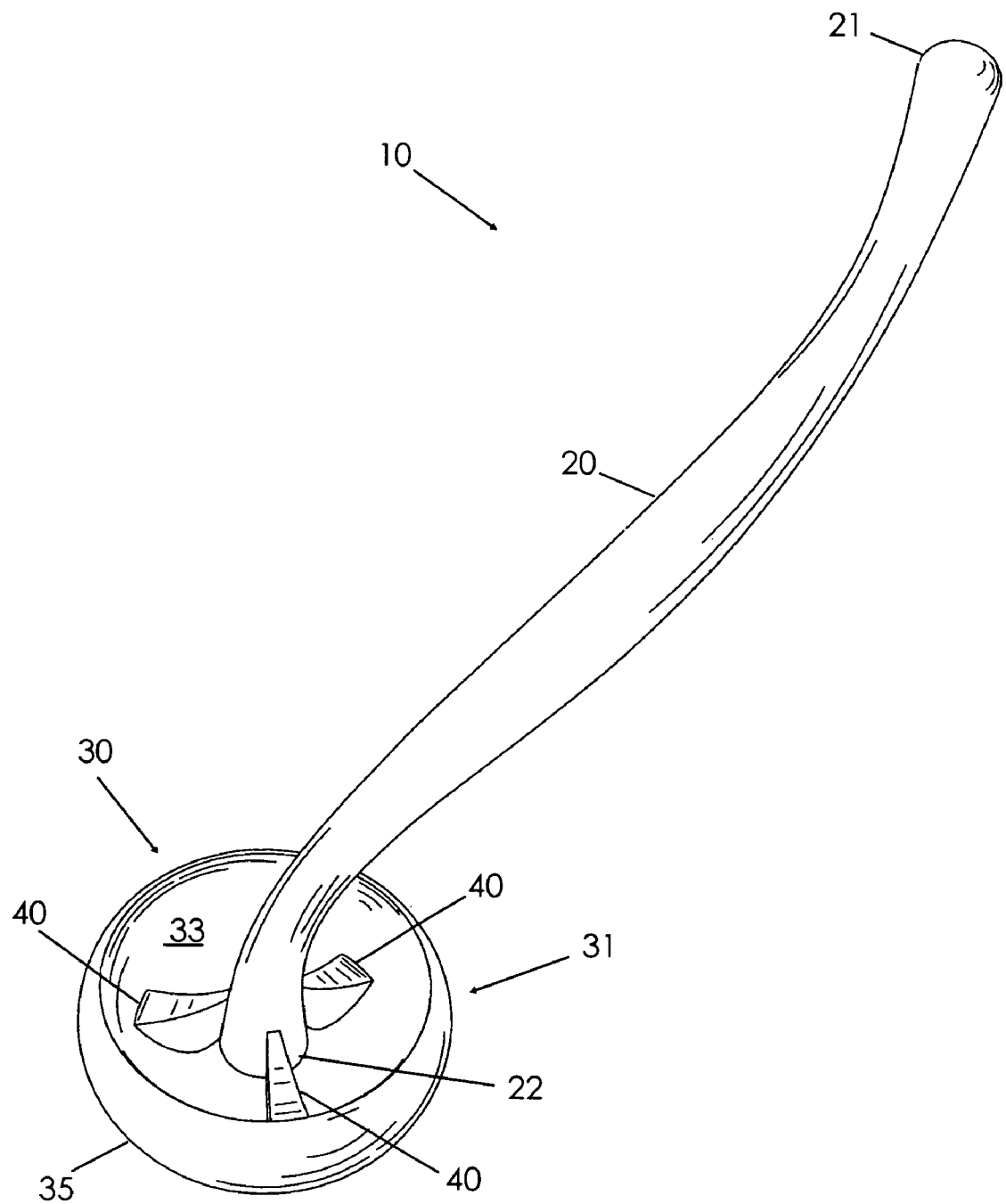
FIG. 1 is a perspective view of a fishing lure according to the present invention.

A fishing lure according to the present invention will now be described in detail with reference to FIGS. 1 through 2b of the accompanying drawings. More particularly, a fishing lure 10 includes a flexible elongate body member 20 and a cupped tail member 30. The cupped tail member 30 is preferably a hollow frustospherical tail member 35. At least one rib member 40 is preferably included.

The flexible elongate body member 20 is preferably worm-shaped and has first and second ends 21, 22. The cupped tail member 30 is fixedly attached to the second end 22 of the body member 20 for moving between concave and convex configurations 31, 32 (FIGS. 2a and 2b). The movement of the cupped tail member 30 between the concave and convex configurations 31, 32 creates low frequency pulses to attract fish. The cupped tail member 30 is constructed of a resilient plastic material that biases the cupped tail member 30 toward the concave configuration 31.

The rib members 40 are spaced apart and connect the second end 22 of the body member 20 to an inner surface 33 of the cupped tail member 30. The rib members 40 are constructed of a flexible and resilient plastic material that biases the tail member 30 toward the concave configuration 31, and the fishing lure 10 may be a one-piece molded construction of a flexible and resilient plastic material.

The body member 20, the cupped tail member 30, the rib members 40, or the entire fishing lure 10 may include a scent for attracting fish. Further, the body member 20, the cupped tail member 30, the rib members 40, or the entire fishing lure 10 may be worm-colored for aesthetic purposes or may be colored differently to suit other purposes. Neon colors may be used, for example, to distinguish the fishing lure 10 from other fishing lures.

In use, the first end 21 of the body member 20 is attached to a fishing line and cast into the water. The attachment means and fishing line are conventional and are not shown. When in the water, the cupped tail member 30 is initially in the concave configuration 31. As the fishing lure 10 is pulled through the water at a low rate of travel, the cupped tail member 30 remains in the concave configuration 31. The concave configuration 31 slows the movement of the fishing lure 10 through the water and causes the fishing lure 10 to travel erratically. When the fishing lure 10 is pulled through the water at a high rate of travel, the cupped tail member 30 moves from the concave configuration 31 to the convex configuration 32 due to increased pressure on the inner surface 33 of the cupped tail member 30. The movement of the cupped tail member 30 from the concave configuration 31 to the convex configuration 32 creates a low frequency pulse. The cupped tail member 30 then returns to the concave configuration 31 due to the bias provided by the cupped tail member 30 and the rib members 40. Another low frequency pulse is created when the cupped tail member 30 moves from the convex configuration 32 to the concave configuration 31.

The low frequency pulses, the slow erratic movement created by the shape of the cupped tail member 30, the inviting shape of the fishing lure 10, and the scent included in the fishing lure 10 attract fish in numerous ways and provide a new and effective fishing lure. Further, since the fishing lure 10 may be a one-piece molded construction, the fishing lure 10 can be easily and inexpensively manufactured.

It is understood that while certain forms of this invention have been illustrated and described, it is not limited thereto except insofar as such limitations are included in the following claims and allowable functional equivalents thereof.

The invention claimed is:

1. A fishing lure, comprising:
   a flexible elongate body member with first and second ends having a central axis through said first and second ends;
   a circular shaped cupped tail member fixedly attached to said second end of said body member, said cupped tail member having a configuration that is normally biased in a concave configuration and movable between said concave configuration and a convex configuration to create low frequency pulses; and
   wherein said cupped tail member is at said concave configuration when pulled through water at a low rate of travel and is at said convex configuration when pulled through water at a high rate of travel wherein the circular-shaped cupped tail member has a central axis parallel to said central axis of said flexible elongated body.

2. The fishing lure as in claim 1 wherein said cupped tail member is constructed of a resilient plastic material for biasing said cupped tail member toward said concave configuration.

3. The fishing lure as in claim 1 further comprising a plurality of spaced apart rib members interconnecting an inner surface of said cupped tail member and said second end of said body member.

4. The fishing lure as in claim 3 wherein said rib members are constructed of a resilient plastic material for biasing said cupped tail member toward said concave configuration.

5. The fishing lure as in claim 3 wherein said fishing lure is a one-piece molded construction of a flexible and resilient plastic material.

6. The fishing lure as in claim 5 wherein said flexible and resilient plastic material includes a scent for attracting fish.

7. The fishing lure as in claim 1 wherein said body member is impregnated with a scent for attracting fish.

8. The fishing lure as in claim 1 wherein said cupped tail member is impregnated wit a scent for attracting fish.

9. The fishing lure as in claim 1 wherein said body member is worm-shaped.

10. A fishing lure, comprising:
    a flexible worm-shaped body member with first and second ends having a central axis through said first and second ends;
    a hollow tail member fixedly attached to said second end of said body member and that is biased in a concave configuration, said tail member being movable between said concave configuration and a convex configuration, wherein said movement from said concave configuration to said convex configuration creates a low frequency pulse; and
    wherein said cupped tail member is at said concave configuration when pulled through water at a low rate of travel and Mat said convex configuration when pulled through water at a high rate of travel wherein the circular-shaped cupped tail member has a central axis parallel to said central axis of said flexible elongated body.

11. The fishing lure as in claim 10 wherein said tail member is constructed of a resilient plastic material for biasing said tail member toward said concave configuration.

12. The fishing lure as in claim 10 further comprising a rib member connecting said body member to an inner surface of said tail member for biasing said tail member toward said concave configuration.

13. The fishing lure as in claim 10 further comprising a plurality of rib members connecting said body member to an inner surface of said tail member for biasing said tail member toward said concave configuration.

14. The fishing lure as in claim 13 wherein said fishing lure is a one-piece molded construction of a flexible and resilient plastic material.

15. The fishing lure as in claim 14 wherein said flexible and resilient plastic material is worm-colored.

16. The fishing lure as in claim 14 wherein said flexible and resilient plastic material includes a scent for attracting fish.

17. The fishing lure as in claim 16 wherein said flexible and resilient plastic material is worm-colored.

* * * * *